(12) United States Patent
Kieselbach

(10) Patent No.: US 6,536,267 B2
(45) Date of Patent: Mar. 25, 2003

(54) ANGULAR POSITION SENSOR UNIT

(75) Inventor: Jürgen Kieselbach, Emsetal (DE)

(73) Assignee: PWB-Ruhlatec Industrieprodukte GmbH, Seebach (DE)

(*) Notice: Subject to any disclaimer, the term of this patent is extended or adjusted under 35 U.S.C. 154(b) by 44 days.

(21) Appl. No.: 09/742,672

(22) Filed: Dec. 20, 2000

(65) Prior Publication Data

US 2001/0011698 A1 Aug. 9, 2001

(30) Foreign Application Priority Data

Dec. 22, 1999 (DE) .......................... 199 62 066

(51) Int. Cl.⁷ .................................. G01P 3/18
(52) U.S. Cl. ..................................... 73/118.1
(58) Field of Search ................ 250/231; 123/476; 324/173, 208; 335/302; 73/116, 118.1

(56) References Cited

U.S. PATENT DOCUMENTS 4,835,505 A    5/1989  Hattori et al. ............. 335/302
5,081,416 A *  1/1992  La Croix .................... 324/173
6,360,593 B1 * 3/2002  Schoenfeld .................. 73/146

FOREIGN PATENT DOCUMENTS

| EP | 0725280 A1 | 7/1996 |
| GB | 2196287 A  | 4/1988 |
| GB | 2332280 A  | 6/1999 |

* cited by examiner

Primary Examiner—Eric S. McCall
Assistant Examiner—Monica D. Harrison
(74) Attorney, Agent, or Firm—Darby & Darby

(57) ABSTRACT

An angular position sensor unit has an encoder disc that is connected through a hub to an element whose angular position is to be measured. The encoder disc is made of a plastic material with a thickness between 0.1 and 1.0 mm and a planarity of <0.2 mm. An opening through the center of the encoder disc receives a flange of the hub. The flange has three or more ridges extending symmetrically in radial directions and engaging punched slots of the encoder disc. The slots conform to the contours of the ridges, so that the encoder disc is held in its position relative to the hub in a form-fitting, positive manner. In the axial direction, the disc is locked in place by the retainer.

2 Claims, 4 Drawing Sheets

ANGULAR POSITION SENSOR UNIT

BACKGROUND OF THE INVENTION

The invention relates to an angular position sensor unit consisting of an encoder disc that is connected by way of a hub to the element on which a measurement is performed for the purpose of determining the angular position of a shaft, axle or wheel.

To measure angles of rotation and/or numbers of revolutions, one uses angular position sensors that have to meet exacting requirements in regard to the accuracy of the measurement within a wide temperature range. A particular problem exists in the mechanical fixation of the encoder disc on a suitable carrier, e.g., a hub, because the connection between the encoder disc and its carrier needs to be play-free and stress-free in relation to a sensor/emitter unit in the axial and radial directions over the entire specified temperature range.

OBJECT OF THE INVENTION

The object of the present invention is to further develop an angular position sensor of the kind described above, so that a measuring accuracy of $\leq 0.5$ degrees of angle is achieved within a temperature range of $-40$ to $+80°$ C. and unrestricted functionality is maintained in the presence of vibrations in a frequency range between 8 and 200 Hz with an effective acceleration of >1 g.

SUMMARY OF THE INVENTION

To meet the foregoing objective, the invention provides an angular position sensor unit with an encoder disc, a hub and a retainer. The hub is designed to be connected to an element whose angular position is to be measured. The encoder disc is made of a plastic material with a thickness between 0.1 and 1.0 mm and a planarity of <0.2 mm. An opening through the center of the encoder disc is engaged in a flange of the hub. The flange has three or more ridges extending symmetrically in radial directions and engaging three punched slots of the encoder disc. The slots conform to the contours of the ridges, so that the encoder disc is held in its position relative to the hub in a form-fitting, positive manner. In the axial direction, the disc is locked in place by the retainer.

In practical embodiments of the invention, it has been found advantageous, if the encoder disc and the hub are designed and manufactured substantially in accordance with the following dimensional tolerances:

for the central opening of the encoder disc, +0.1 mm;
for the slot width of the encoder disc, +0.1 mm;
for the slot length of the encoder disc, +0.1 mm;
for the width of the ridges on the hub, −0.05 mm; and
for the length of the ridges on the hub, −0.05 mm.

Further in accordance with the invention, it has been found practical if the hub and the retainer are arranged on a common axis.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

The following detailed description relates to an embodiment of the invention as illustrated in the attached drawing, wherein.

DETAILED DESCRIPTION OF A PREFERRED EMBODIMENT

Figure 1:
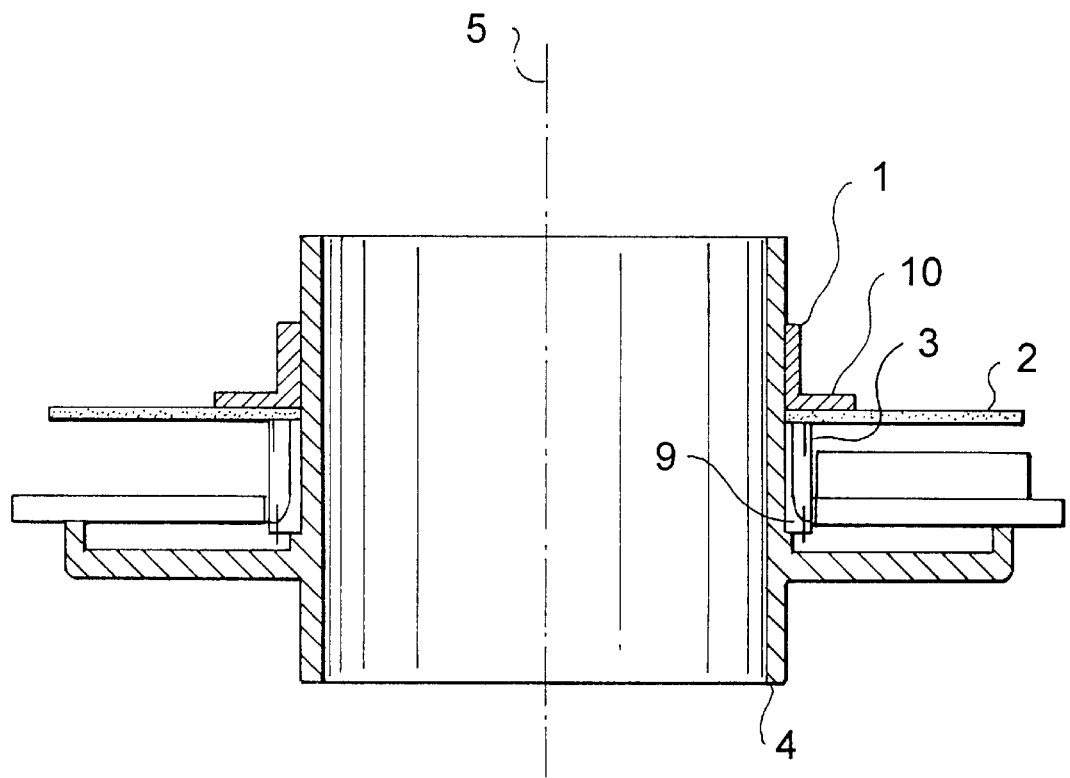
FIG. 1 illustrates how the encoder disc/hub assembly according to the invention is installed in the case of a steering angle sensor of a motor vehicle.

As illustrated in FIG. 1, the combined encoder disc and hub assembly unit of the angular position sensor according to the invention is composed of a hub 1, an encoder disc 2, and a retainer 3. In the illustrated embodiment, the function of the retainer 3 is performed by a driving pinion 9 of a reduction gear drive. The hub 1 is rigidly connected to a steering column 4, so that a rotary movement of the steering column 4 relative to its axis 5 is transferred immediately to the hub 1 and, consequently, to the encoder disc 2.

Figure 2:
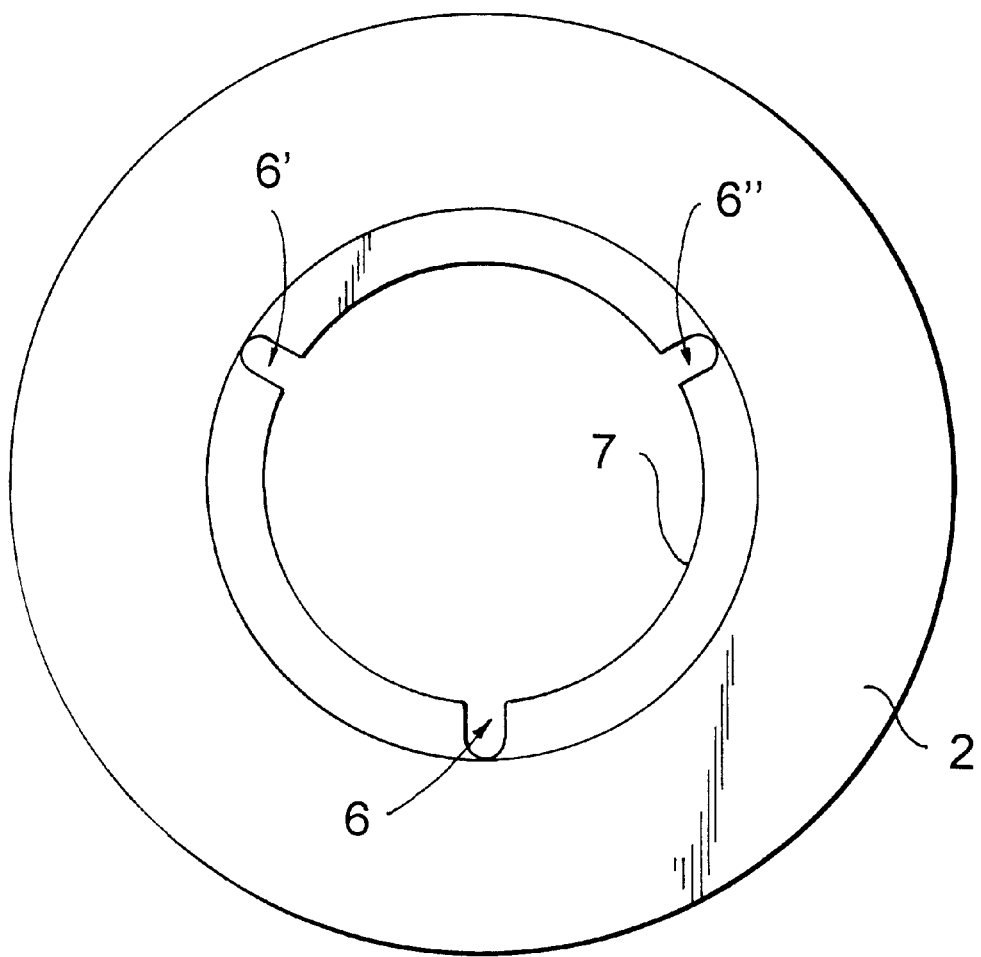
FIG. 2 represents a plane view of an encoder disc according to the invention.

The actual transfer of the rotary movement from the hub (shown in FIGS. 3, 4) to the encoder disc (shown in FIG. 2) occurs between the ridges 8, 8', 8" and the slots 6, 6', 6", respectively. In the example of an encoder disc illustrated in FIG. 2, the slots extend radially like spokes on a wheel from the opening 7 of the encoder disc 2. Preferably, the slots 6, 6', 6" are punched out of the plastic material of the encoder disc 2, which assures that the prescribed tolerances can be reliably maintained. The tolerance range for the slots is specified as +0.1/−0 mm with regard to a slot width of 2 mm.

The slots 6, 6', 6" are cooperatively engaged by the ridges 8, 8', 8" of the hub 1. Like the slots 6, 6', 6", the ridges 8, 8', 8" are oriented radially in relation to the axis of rotation and extend to a peripheral area of the flange 10. Preferably, the ends of the slots and the radially outward-facing end surfaces of the ridges 8, 8', 8" have rounded contours to avoid a so-called notch effect, i.e., stress concentrations that could occur at sharp concave corners of the slots when the encoder disc 2 is set in place on the hub.

Figure 3:
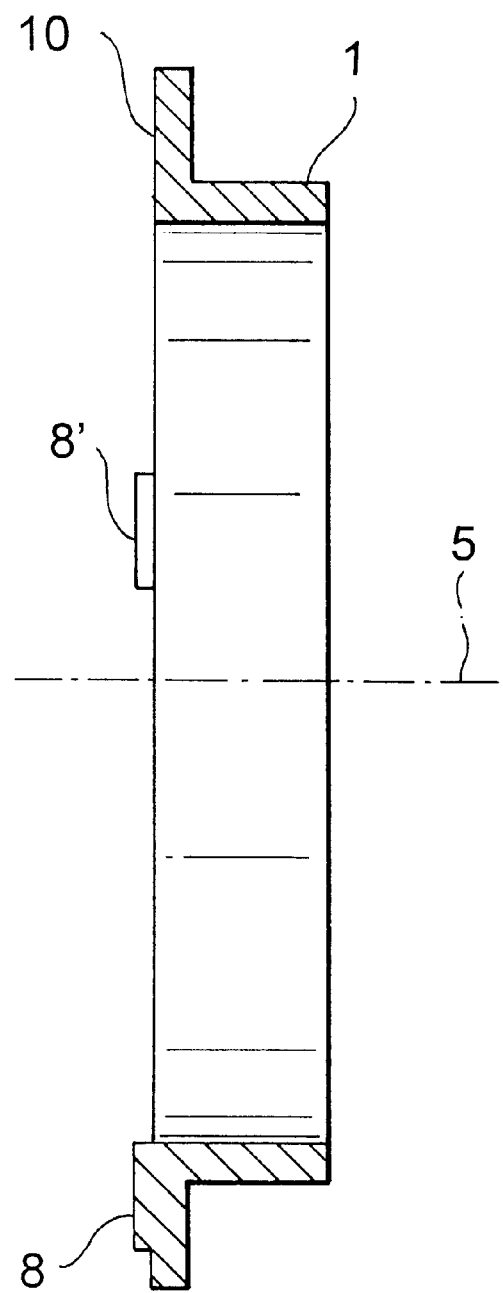
FIG. 3 represents a cross-sectional view of a hub according to the invention seen in the cross-section X—X indicated in FIG. 4.
Figure 4:
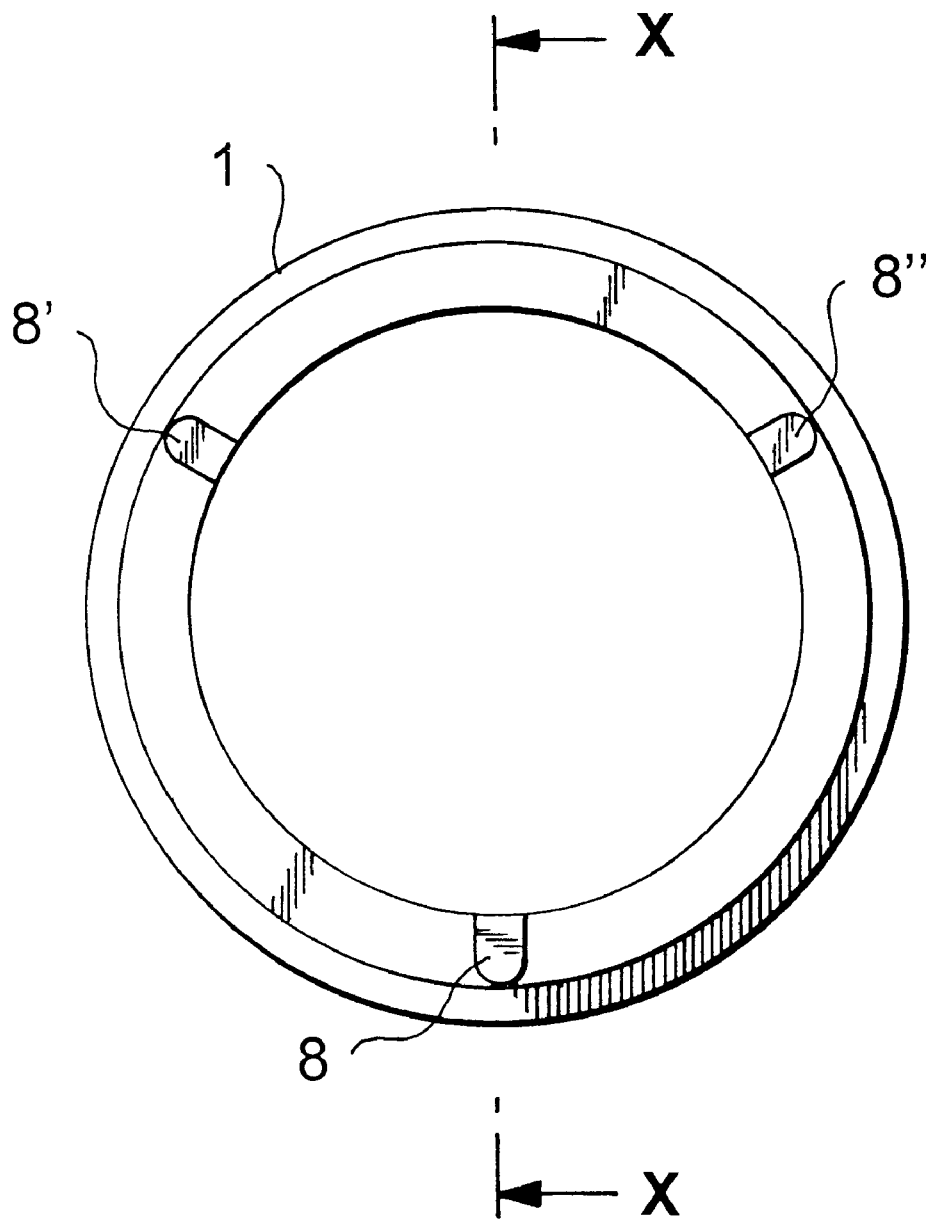
FIG. 4 represents a plane view of a hub according to the invention.

The hub 1 that is illustrated in FIGS. 3 and 4 is preferably made of an aluminum alloy of the type Al—Cu—Mg. This alloy has been proven to be very durable in mechanical as well as climatic shock tests with the plastic-based encoder disc.

The shock tests and thermal stress tests were performed under the following test conditions:

1. At −40° C., an acceleration of 100 g was applied in a time interval of 6 milliseconds. In this test, the movement transverse to the direction of the shock, i.e., in the radial direction of the disc, was not allowed to reach at any point in time a positive or negative acceleration greater than 30% of the nominal applied shock acceleration in the given direction.
2. At temperatures between −40° C. and +80° C., the components of the angular position sensor of the present invention where exposed to a rate of temperature change of 1° C. per minute. A total of 2 temperature cycles were performed during a test period of 8 hours. The angular position sensor, in this case a steering angle sensor, passed this test, likewise, without any measurable damage.

Thus, the tests prove conclusively that the encoder disc can be mechanically held in place on a suitable carrier, e.g., a hub, in such a manner that the connection between the encoder disc and its carrier remains play-free and stress-free in the axial and radial directions over the entire specified temperature range. Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the afore-described contribution to the art and, therefore, such adaptations should and are intended to be comprehended within the meaning and range of equivalence of the appended claims.

What is claimed is:

1. An angular position sensor unit, comprising an encoder disc, a hub with a flange, and a retainer, wherein the hub is adapted for connection to a rotary element on which a measurement of an angle of rotation is to be performed, the encoder disc comprises a plastic material with a thickness between 0.1 and 1.0 mm and a planarity of <0.2 mm, the encoder disc has a central opening adapted to be engaged by the flange, with at least three punched slots extending symmetrically in radial directions from the central opening;

the flange has ridges positioned and contoured to match the at least three punched slots;

the encoder disc is held in position on the hub in a form-fitting, positive manner by means of said ridges and slots and is axially locked in place by the retainer.

2. The angular position sensor unit of claim 1, wherein the hub and the retainer are arranged on a common axis.

* * * * *